US012621326B2

(12) United States Patent
Shah et al.

(10) Patent No.: US 12,621,326 B2
(45) Date of Patent: May 5, 2026

(54) OPTIMIZED DEEP PACKET INSPECTION (DPI) ANYWHERE

(71) Applicant: Arista Networks, Inc., Santa Clara, CA (US)

(72) Inventors: Sandip Shah, Fremont, CA (US); Michael T. Stolarchuk, Ypsilanti, MI (US); Sean Dao, Gardena, CA (US)

(73) Assignee: Arista Networks, Inc., Santa Clara, CA (US)

( * ) Notice: Subject to any disclaimer, the term of this patent is extended or adjusted under 35 U.S.C. 154(b) by 50 days.

(21) Appl. No.: 18/414,362

(22) Filed: Jan. 16, 2024

(65) Prior Publication Data

US 2025/0233876 A1 Jul. 17, 2025

(51) Int. Cl.
*H04L 9/40* (2022.01)
*H04L 41/0803* (2022.01)

(52) U.S. Cl.
CPC ...... *H04L 63/1425* (2013.01); *H04L 41/0803* (2013.01)

(58) Field of Classification Search
CPC ............. H04L 63/1425; H04L 41/0803; H04L 63/0227; H04L 43/028; H04L 63/1408; G06F 21/554
See application file for complete search history.

(56) References Cited

U.S. PATENT DOCUMENTS

| | | | |
|---|---|---|---|
| 10,250,755 B2 * | 4/2019 | Richards | ............... G06F 9/5016 |
| 2015/0120914 A1 * | 4/2015 | Wada | ................. H04L 41/5009 |
| | | | 709/224 |

| | | | |
|---|---|---|---|
| 2015/0304865 A1 * | 10/2015 | Poscher | ................ H04W 24/10 |
| | | | 370/252 |
| 2018/0006923 A1 * | 1/2018 | Gao | ......................... H04L 43/12 |
| 2019/0014137 A1 * | 1/2019 | Du | ......................... G06F 21/554 |
| 2019/0109782 A1 * | 4/2019 | Shah | ....................... H04L 45/52 |
| 2019/0116111 A1 * | 4/2019 | Izard | ....................... H04L 45/24 |
| 2019/0166021 A1 * | 5/2019 | Grosser | .................. H04L 43/18 |

(Continued)

OTHER PUBLICATIONS

Hubballi et al., "XSSMitigate: Deep Packet Inspection based XSS Attack Quarantine in Software Defined Networks," 2023 IEEE International Conference on Consumer Electronics (ICCE) Year: 2023 | Conference Paper | Publisher: IEEE.*

(Continued)

*Primary Examiner* — Roderick Tolentino
(74) *Attorney, Agent, or Firm* — Tianyi He

(57) ABSTRACT

A method of monitoring network traffic flowing in a production fabric, includes, in part, receiving a multitude of mirrored packets of the traffic flow at a service node disposed in a monitoring fabric that is distinct from the production fabric. From the received packets, the start of a communication session established between a first client and a second client on the production fabric is determined. A subset of the received packets are then selected for deep packet inspection at the service node to identify metadata associated with the network traffic of the identified session. The metadata may be used to identify the software application that generates the traffic flow. The mirrored packets may include packets sent from the first client to the second client, as well as packets sent from the second client to the first client.

20 Claims, 5 Drawing Sheets

(56)                    References Cited

U.S. PATENT DOCUMENTS

2023/0300059 A1* 9/2023 Rodriguez Natal .... H04L 45/64
                                                        709/238
2024/0114339 A1* 4/2024 Ramakrishnan ...... H04W 60/00

OTHER PUBLICATIONS

Saputra et al., "Detecting and blocking onion router traffic using
deep packet inspection," 2016 International Electronics Symposium
(IES) Year: 2016 | Conference Paper | Publisher: IEEE.*

* cited by examiner

OPTIMIZED DEEP PACKET INSPECTION (DPI) ANYWHERE

RELATED APPLICATION

The present application is related to U.S. patent application Ser. No. 17/644,410, filed on Dec. 15, 2021, the content of which is incorporated herein by reference in its entirety.

BACKGROUND

Network monitoring tools are often deployed to identify security threats, prevent unauthorized access, and thwart cyber-attacks. Monitoring the traffic in a conventional communications network in order to detect malicious activities often requires a physical connection to a network appliance disposed in the network. Establishing a physical connection to an appliance used in today's extensive and highly complex enterprise or datacenter networks is costly, time consuming and unscalable. A need continues to exist for an improved technique for monitoring network traffic.

BRIEF DESCRIPTION OF THE DRAWINGS

With respect to the discussion to follow, and in particular, to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
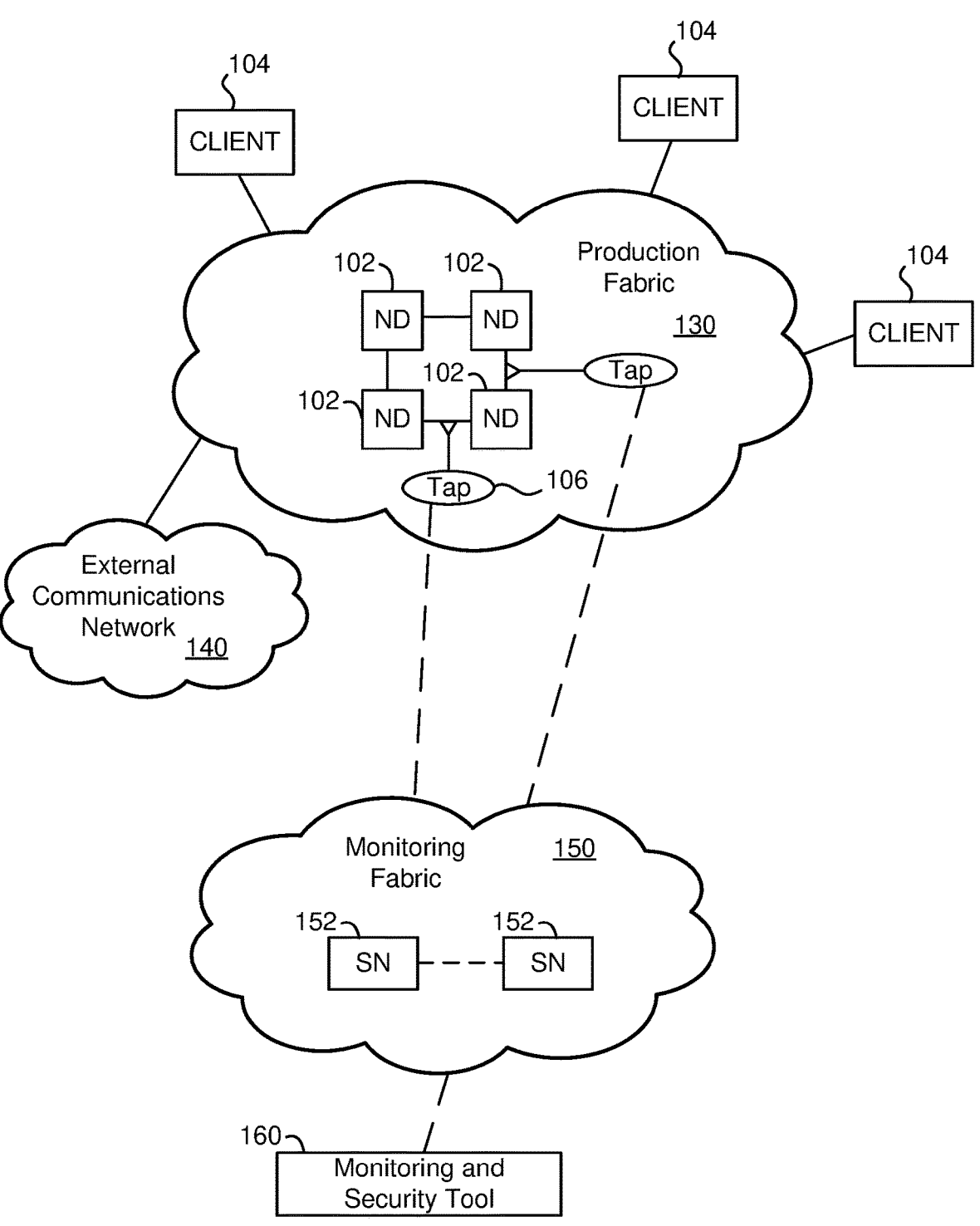
FIG. 1 is a high level diagram of a production fabric in communication with a monitoring fabric to perform deep packet inspection, in accordance with one embodiment of the present disclosure.

The present disclosure is directed to real-time monitoring and deep packet inspection (DPI) of sessions occurring in a network communication system. Network traffic is tapped at one or more points in a production network (also referred to herein as production fabric), mirrored and forwarded to a monitoring fabric in which real-time DPI operation is carried out. As described further below, a network monitoring system, in accordance with embodiments of the present disclosure, is highly scalable and has a distributed architecture. Because the DPI, in accordance with embodiments of the present disclosure, is performed in the monitoring fabric, relatively large and complex production fabrics may be monitored without being subjected to performance degradation.

The monitoring fabric includes, in part, one or more service nodes that receive and session-slice the mirrored traffic so that only a subset of packets of each session (e.g., TCP session) are selected for the DPI operation. In one example, the subset of packets selected for the DPI operation may be the first 5-15 packets of a TCP session, thus significantly reducing the amount of data used to inspect the traffic, while concurrently improving the performance, and reducing the storage requirements. In accordance with another aspect of the present disclosure, mirrored packets may be encapsulated into layer 2 generic routing encapsulation (L2GRE) packets and forwarded to a service node for the DPI operation via, for example, a layer-3 network. It is understood that the mirrored packets may be encapsulated using any packet encapsulation protocol other than the L2GRE, and that embodiments of the present disclosure are not limited to L2GRE or any other packet encapsulation protocol.

Because, in accordance with one aspect of the present disclosure, DPI is performed by the service nodes on the monitoring fabric, the traffic flow in the production fabric is not degraded. Information obtained by performing DPI on the session-sliced packets includes, for example, the type and identity of application from which the packets are mirrored. Such information may be transferred by the service nodes to a collector using, for example, the IPFIX protocol. By identifying the application type and other metadata associated with the traffic flow, malicious activity, such as access to malicious websites and transmission of sensitive data, is prevented.

A network monitoring system, in accordance with embodiments of the present disclosure, therefore, dispenses with the need for time consuming and costly wiring that would otherwise be required to access and monitor the traffic in, for example, a subnet or a network leaf node where suspicious activity may be underway. By making modifications to an existing set of network policies, the network traffic from the subnet may be directed and delivered to the monitoring network for a DPI operation. Moreover, a network monitoring system, in accordance with embodiments of the present disclosure, enables DPI to be carried out for a user-specified number of IP addresses or IP protocols, thus providing network administrators with a network monitoring tool that is scalable, flexible, configurable, easy to use, and less costly than conventional network monitoring tools. In some embodiments, the network monitoring system of the present disclosure uses the DANZ Monitoring Fabric® (DMF) that is commercially available from Arista Networks of Santa Clara, California.

FIG. 1 shows a network communication system 100 that includes, in part, a production fabric 130 and a monitoring fabric 150, in accordance with one embodiment of the present disclosure. Production fabric 130 may be associated with an organization or enterprise, such as, a business, an educational institution, a governmental entity, a healthcare facility, a data center, and the like. Monitoring fabric 150 is adapted to monitor the traffic flow in production fabric 130.

Production fabric 130 is shown as including, in part, a multitude of interconnected network devices (ND) 102. Network devices 102 may include routing and switching devices such as top-of-rack ("ToR") switches, aggregation switches, gateways, ingress and/or egress switches, provider edge devices, and the like. Network devices 102 form a communications network among clients 104 which may be, for example, computing devices (e.g., desktop computers, laptops, mobile devices, etc.) and servers (e.g., database servers, web services, etc.). Production fabric 130 may be connected to an external network 140, such as a public switched network. Clients 104 may communicate with one another via network devices 102.

Production fabric 130 is also shown as including, in part, a multitude of data taps 106 configured to enable the monitoring and analysis of the traffic flowing among network devices 102. Data taps 106 are configured to mirror (copy) the packets flowing in production fabric 130 and deliver the mirrored packets to monitoring fabric 150. Each data tap 106 may be a network tap devices, or a switched-port analyzer (SPAN) port, and the like. Monitoring fabric 150 includes one or more service nodes (SN) 152 configured to receive and analyze the mirrored packets, as described in detail below.

In some embodiments, service nodes 152 are configured to perform DPI on a subset of the mirrored packets and supply the inspection results to one or more network monitoring and security tools 160 adapted to monitor network performance, detect and respond to threats, identify malicious actors, and the like. Network monitoring tools 160 include, but are not limited to, packet analyzers, packet recorders, bandwidth monitors, and the like.

Figure 2:
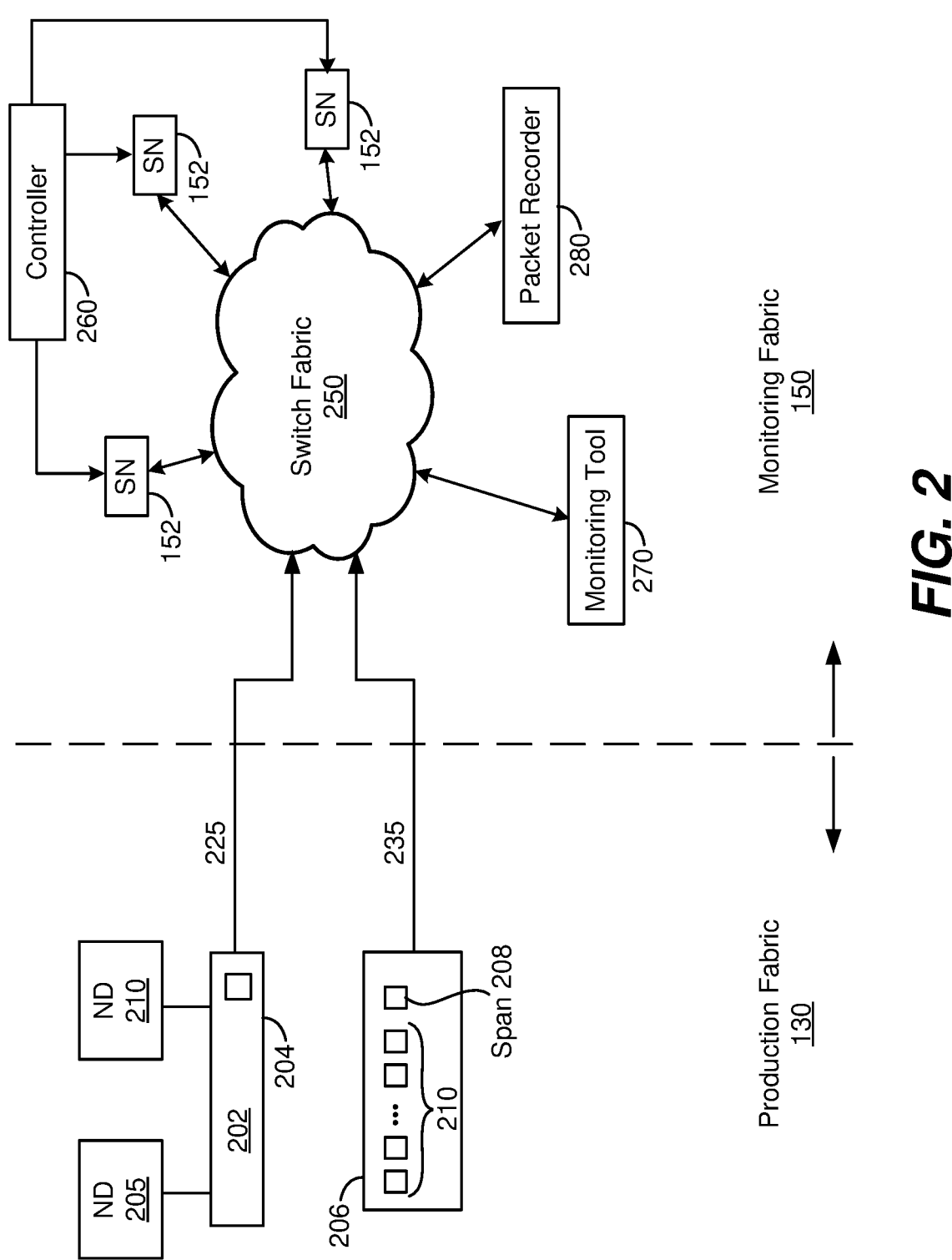
FIG. 2 shows more details of the production fabric and the monitoring fabric of FIG. 1, in accordance with one embodiment of the present disclosure.

FIG. 2 shows more details of the production fabric 130 and monitoring fabric 150 of FIG. 1. Network tap device 202, which corresponds to any of taps 106 shown in FIG. 1, is connected between network devices 205 and 210. Network tap device 202 is configured to monitor and mirror the packets flowing between network devices 205 and 210 without impeding their traffic flow. Network tap device 202 includes a monitor port 204 from which the mirrored packets are forwarded from the production fabric 130 to the monitoring fabric 150. A network tap device may be a special port on a network device (e.g., switch, router, etc.) configured to mirror the traffic, e.g., a SPAN port. FIG. 2 shows a second network tap device 206 disposed in production fabric 130. Network tap device 206 is shown as including, in part, a multitude of ports 210 configured to connect network tap device 206 to other devices (not shown), as well as a SPAN port 208 configured to mirror the packets received by network tap device 206 and forward the mirrored packets to monitoring fabric 150. It is understood that a production fabric may have any number of network tap devices.

Monitoring fabric 150 is shown in FIG. 2 as including, in part, a switch fabric 250 and a multitude of service nodes 152 that are connected to the switch fabric. Switch fabric 250 is configured to receive the mirrored packets 225, 235 from network tap devices 202, 206 respectively, and forward the mirrored packets to service nodes 152. In yet other embodiments, mirrored packets may be encapsulated into L2GRE packets and forwarded to service node 152 for the DPI operation via, for example, a layer-3 network.

Each service node is configured to perform real-time DPI operation on a subset of the mirrored packets in accordance with a network configuration policy received from, for example, controller 260. Each service node may also be configured to modify the received packets, for example, by adding headers and trailers to the packets, truncating the packets to a specified length, decapsulating the packets by stripping off specified encapsulations, searching for specific regular expressions in the packets, masking out bytes matching specific regular expressions, and the like.

Prior to performing a DPI operation, service node 152 session slices the mirrored packets associated with a session (e.g., TCP session) to select a subset of the mirrored packets of each session for the DPI operation. In one example, only the first 5-15 packets of each session are used for the DPI. The session-sliced packets may also be forwarded to a monitoring tool 270 via switch network 250 for further operations. In one embodiment, a service node may be configured to store packets. In other embodiments, a packet recorder 280 disposed in the monitoring fabric may be configured to store the mirrored packets for subsequent review, playback and DPI inspection. Moreover, by changing the network configuration policy, mirrored traffic from, for example, a subnet or a network leaf node of a production fabric is encapsulated into L2GRE packets and delivered via a layer-3 network to a service node for a DPI operation.

Figure 3:
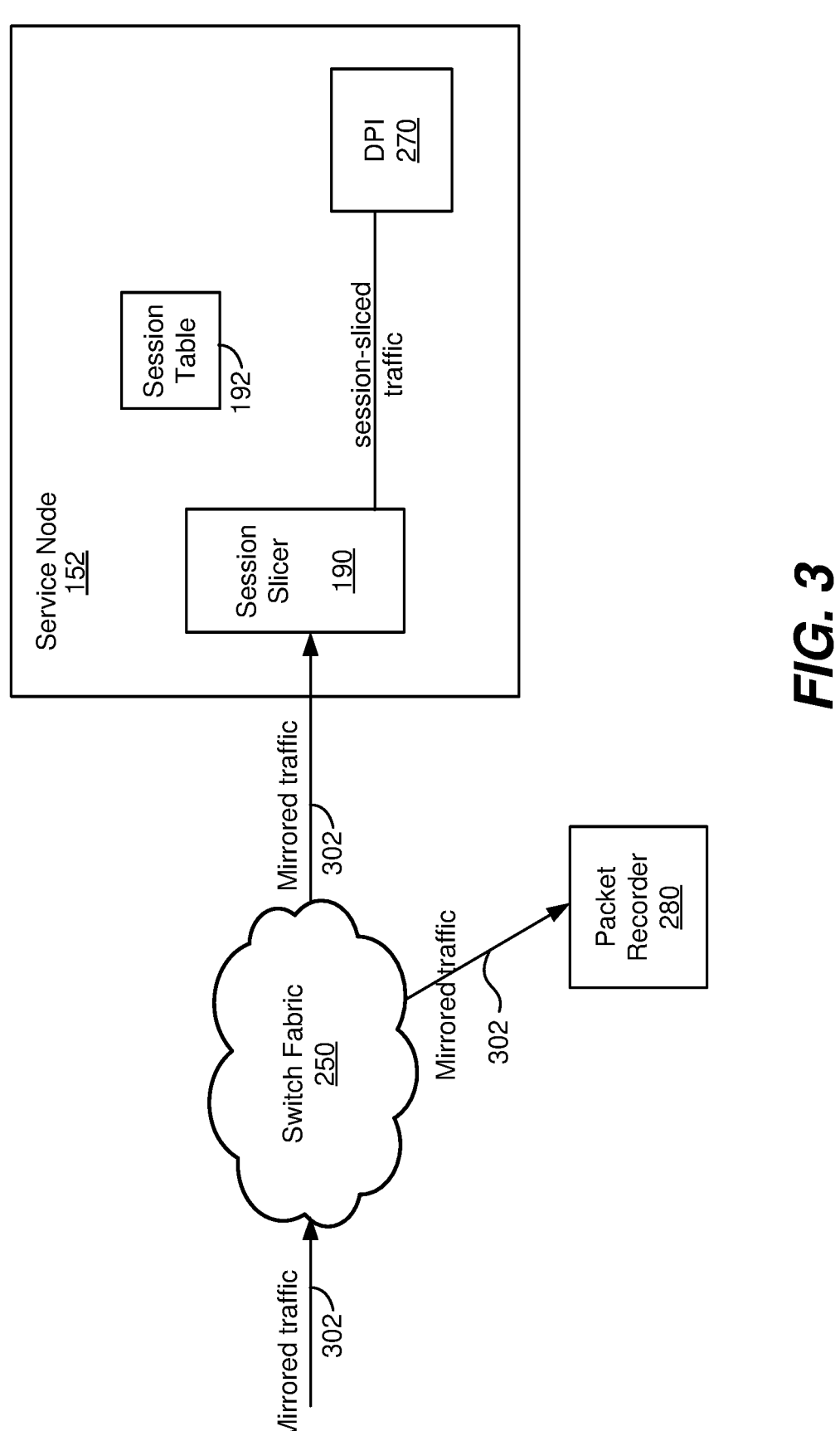
FIG. 3 shows a service node in communications with a switch fabric of the monitoring fabric of FIG. 1, in accordance with one embodiment of the present disclosure.

FIG. 3 shows more details of a switch fabric 250 that is in communications with a service node 152 of a monitoring fabric, in accordance with one embodiment of the present disclosure. Mirrored traffic (packets) 302 is forwarded to service node 152 by switch fabric 250. Switch fabric 250 may also forward the mirrored traffic 302 to packet recorder 280, as described above.

Each service node 152 is shown as including, in part, an optional session slicer 190 and a session table 192. Session table 192 includes entries about each session in connection with which the service node has received mirrored packets. Session slicer 190 is configured to pass portions of the mirrored traffic 302 in a session slicing operation and forward a subset of the packets of each sliced session to DPI block 270 for a DPI operation. Session slicer 190 is configured to identify sessions in the mirrored traffic using the entries in session table 192. Session slices of each session that are not passed back to switch fabric 250 are dropped. DPI block 270 is adapted to perform DPI operation on the subset of the mirrored packets to identify, among other things, the type and identity of the application generating the traffic flow from which the packets were mirrored, the source of the traffic, the destination of the traffic, as described further below. Although service node 152 is shown as including, in part, a session slicer 190, it is understood that embodiments of the present disclosure are not so limited, and that other embodiments of the present disclosure may operate without a session slicer.

A number of advantages are achieved by performing DPI operations, in accordance with embodiments of the present disclosure. For example, embodiments of the present disclosure may apply DPI to enable network administrators to enhance network security by monitoring network traffic, thereby identifying and preventing potential security threats, such as malware, viruses, and hacking attempts. In accordance with another embodiment of the present disclosure, DPI may be used to block access to malicious websites and prevent the transmission of sensitive data. Embodiments of the present disclosure may further be used to enhance network performance by applying DPI to identify and prioritize network traffic based on the traffic's content, thus enabling more efficient use of network resources. Therefore, latency is reduced and network speed is increased. Applying DPI, in accordance with embodiments of the present disclosure, further enables application based routing, thus enhancing, for example, the performance of software as a service (SaaS) applications.

The DPI, when applied in accordance with embodiments of the present disclosure, may improve quality of service (QOS) by prioritizing certain types of network traffic, such as voice and video, over other types of network traffic, such as email or web browsing. Therefore, more critical applications receive the bandwidth and resources they require to function as intended. Moreover, improved network monitoring and troubleshooting may be achieved by providing administrators with detailed information about network traffic and usage patterns, which may be used to diagnose and resolve network issues more quickly and efficiently.

By enabling network administrators to monitor and control the transmission of sensitive data, embodiments of the present disclosure may apply DPI to help organizations comply with various regulations and standards, such as the payment card industry data security standard (PCI DSS). In other words, when applied in accordance with embodiments of the present disclosure, DPI provides network administrators with greater visibility and control over the networks, thereby leading to improved security, performance, and reliability.

Figure 4:
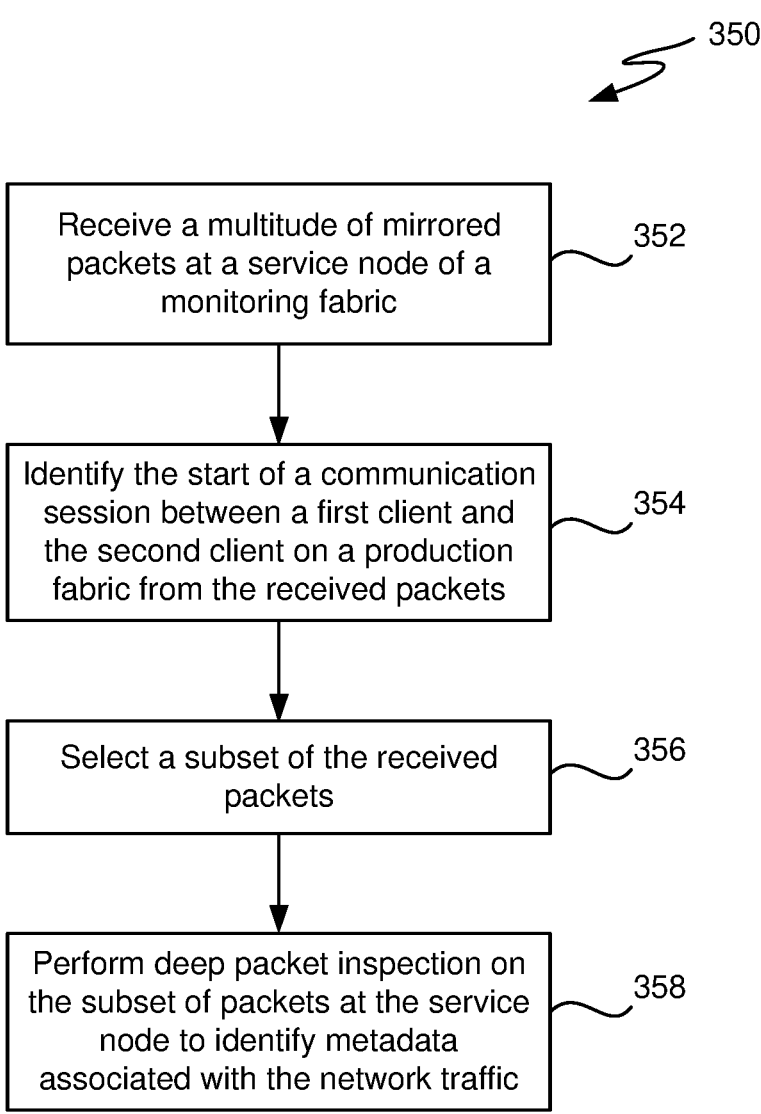
FIG. 4 is a flowchart for monitoring network traffic flowing in a production fabric, in accordance with one embodiment of the present disclosure.

FIG. 4 is a flowchart 350 for monitoring the network traffic flow in a production fabric, in accordance with one embodiment of the present disclosure. At 352, a multitude of mirrored packets of the traffic flow are received at a service node of a monitoring fabric. The monitoring fabric is distinct from the production fabric. At 354, the received packets are used to identify the start of a communication session established between a first client and a second client on the production fabric. At 356, a subset of the received packets are selected for deep packet inspection. At 358, deep packet inspection is performed on the subset of the packets at the service node to identify metadata associated with the network traffic. The metadata may be used to identify the software application that generates the traffic flow. Although not shown, it is understood that the traffic from which the mirrored packets are received may be prioritized by the software application type that generates the traffic, and that the packets associated with such traffic may be dropped or forwarded.

Figure 5:
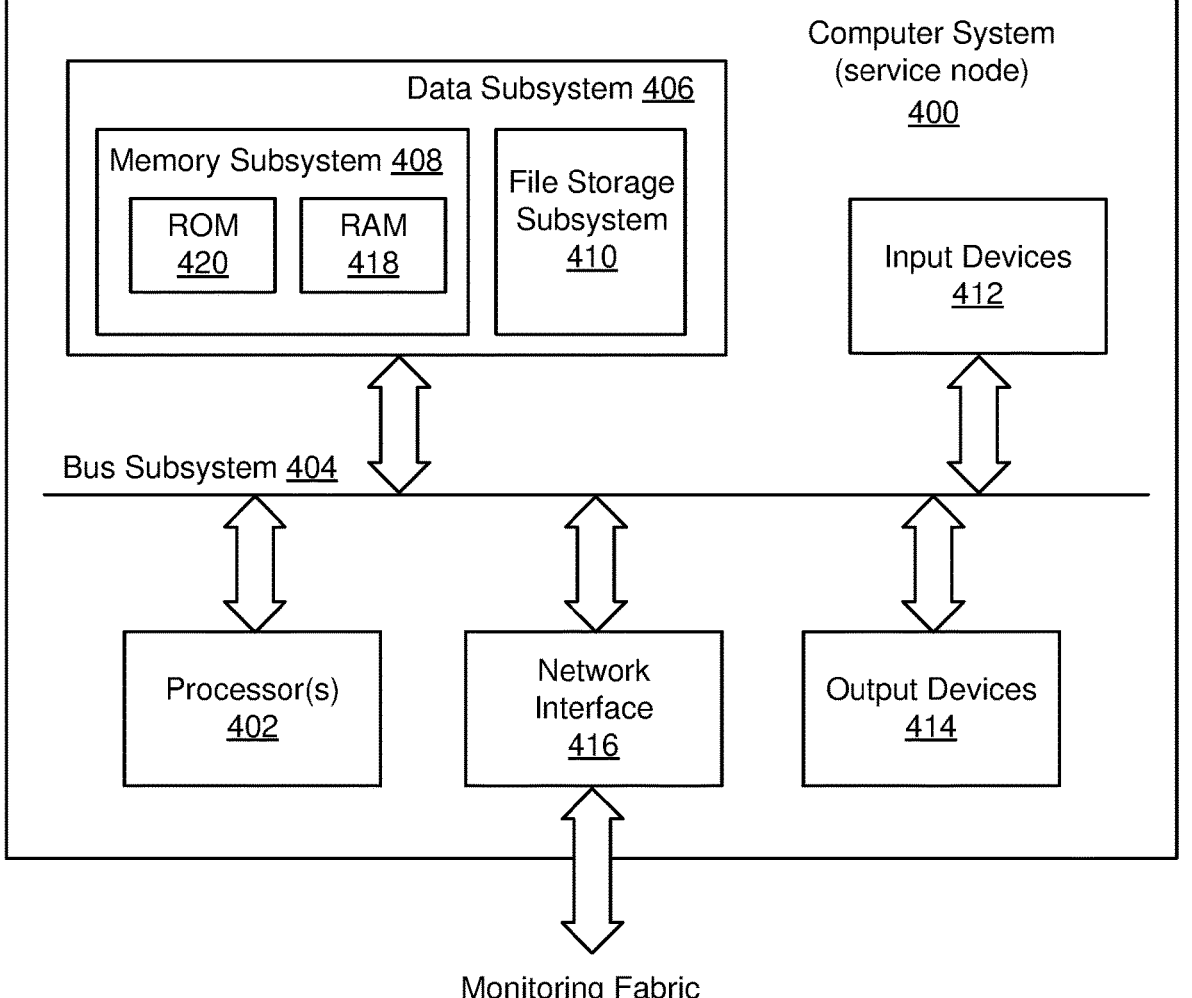
FIG. 5 depicts a simplified block diagram of an exemplary computer system in which some embodiments of the present disclosure may operate.

FIG. 5 depicts a simplified block diagram of an example computer system 400 in accordance with some embodiments. Computer system 400 can be used to implement a service node in accordance with the present disclosure. As shown in FIG. 5, computer system 400 includes one or more processors 402 that communicate with a number of peripheral devices via bus subsystem 404. These peripheral devices include data subsystem 406 (including memory subsystem 408 and file storage subsystem 410), user interface input devices 412, user interface output devices 414, and network interface subsystem 416. Bus subsystem 404 enables the various components and subsystems of computer system 400 to communicate with each other as intended. Although bus subsystem 404 is shown schematically as a single bus, alternative embodiments of the bus subsystem can utilize multiple buses.

Network interface subsystem 416 operates as an interface for communicating data between computer system 400 and other devices (e.g., a switch in monitoring fabric 150). Network interface subsystem 416 may include, e.g., an Ethernet card. User interface input devices 412 may include a keyboard, pointing devices (e.g., mouse, trackball, touch-pad), a touch-screen incorporated into a display, audio input devices (e.g., voice recognition systems, microphones) and other types of input devices. In general, use of the term "input device" is intended to include all possible types of devices and mechanisms for inputting information into computer system 400.

User interface output devices 414 can include a display subsystem, a printer, or nonvisual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 400.

Data subsystem 406 includes memory subsystem 408, and file/disk storage subsystem 410 represent non-transitory computer-readable storage media that can store program code and/or data, which when executed by processor 402, can cause processor 402 to perform operations in accordance with embodiments of the present disclosure.

Memory subsystem 408 includes a number of memories including random access memory (RAM) 418 for storage of instructions and data during program execution and read-only memory (ROM) 420 in which fixed instructions are stored. File storage subsystem 410 provided persistent (i.e., non-volatile) storage for program and data files, and may include a magnetic or solid-state hard disk drive, an optical drive along with associated removable media (e.g., CD-ROM, DVD, Blu-Ray, etc.), a removable flash memory-based drive or card, and/or other types of storage media known in the art. It is understood that computer system 400 is illustrative and many other configurations having more or fewer components than system 400 are possible.

The above description illustrates various embodiments of the present disclosure together with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method of monitoring a production fabric, having a plurality of data taps coupled to a monitoring fabric, the method comprising:

receiving, by a service node of the monitoring fabric, a first plurality of mirrored packets of a traffic flow from at least some of the plurality of data taps and via a switch fabric of the monitoring fabric coupling the plurality of data taps to the service node;

identifying, by the service node of the monitoring fabric, a start of a communication session established between a first client and a second client on the production fabric based on the received first plurality of mirrored packets;

selecting, by the service node of the monitoring fabric, a subset of the received first plurality of mirrored packets; and performing, by the service node of the monitoring fabric, deep packet inspection of the subset of the received first plurality of mirrored packets to identify metadata associated the communication session, wherein the metadata identifies a software application generating the traffic flow and wherein network traffic associated with the traffic flow is prioritized based on a type of the identified software application generating the traffic flow.

2. The method of claim 1 further comprising:

causing packet forwarding for the traffic flow to be prioritized based on the type of the identified software application generating the traffic flow.

3. The method of claim 1 wherein the prioritized network traffic comprises voice network traffic and wherein the prioritized network traffic is prioritized over web browsing network traffic.

4. The method of claim 1 wherein the first plurality of mirrored packets comprise packets sent from the first client to the second client and packets sent from the second client to the first client.

5. The method of claim 1 wherein the deep packet inspection of the subset of the received first plurality of mirrored packets is performed in accordance with instructions requiring an IP address of the subset of the received first plurality of mirrored packets to match one of a specified plurality of IP addresses.

6. The method of claim 1 wherein the deep packet inspection of the subset of the received first plurality of mirrored packets is performed in accordance with instructions requiring an IP protocol of the subset of the received first plurality of mirrored packets to match one of a specified plurality of IP protocols.

7. The method of claim 1 further comprising:
storing the first plurality of mirrored packets.

8. The method of claim 1 wherein the first plurality of mirrored packets of the traffic flow are mirrored in accordance with a network configuration policy, the method further comprising:
changing the network configuration policy to mirror a second plurality of packets of an additional traffic flow from the production fabric.

9. The method of claim 8 further comprising:
encapsulating the second plurality of mirrored packets into layer-2 generic routing encapsulation (L2GRE) packets; and
forwarding the L2GRE packets to the service node via a layer-3 network.

10. The method of claim 9 further comprising:
performing deep packet inspection of a subset of the L2GRE packets at the service node to identify additional metadata associated with the subset of the L2GRE packets.

11. A packet processing system comprising:
one or more computer processors; and
a computer-readable storage medium comprising instructions, which when executed by the one or more computer processors, cause the one or more computer processors to:
receive, from one or more data taps of a production fabric and via a switch fabric of a monitoring fabric that is distinct from the production fabric, a plurality of mirrored packets associated with a traffic flow;
identify, from the received plurality of mirrored packets, a start of a communication session established between a first client and a second client on the production fabric;
select a subset of the received plurality of mirrored packets;
drop a remaining portion of the received plurality of mirrored packets;
perform deep packet inspection of the subset of the received plurality of mirrored packets to identify metadata associated with the communication session; and
provide the identified metadata associated with the communication session to a network monitoring tool that prevents unauthorized access based on the identified metadata.

12. The packet processing system of claim 11 wherein the metadata identifies a software application generating the traffic flow.

13. The packet processing system of claim 11 wherein the deep packet inspection of the subset of the received plurality of mirrored packets is performed using a service node of the monitoring fabric.

14. The packet processing system of claim 11 wherein the plurality of mirrored packets comprise packets sent from the first client to the second client and packets sent from second client to the first client.

15. The packet processing system of claim 11 wherein the deep packet inspection of the subset of the received plurality of mirrored packets is performed in accordance with instructions requiring an IP address of the subset of the received plurality of mirrored packets to match one of a specified plurality of IP addresses.

16. The packet processing system of claim 11 wherein the deep packet inspection of the subset of the received plurality of mirrored packets is performed in accordance with instructions requiring an IP protocol of the subset of the received plurality of mirrored packets to match one of a specified plurality of IP protocols.

17. A non-transitory computer readable medium comprising stored instructions, which when executed by one or more processors of a service node of a monitoring fabric, cause the one or more processors to:
receive, from one or more data taps of a production network and via a switch fabric of the monitoring fabric coupling the one or more data taps of the production network to the service node of the monitoring fabric, a plurality of mirrored packets associated with a traffic flow;
identify, from the received plurality of mirrored packets, a start of a communication session established between a first client and a second client on the production network;
select a subset of the received plurality of mirrored packets;
perform deep packet inspection of the subset of the received plurality of mirrored packets to identify metadata associated with the communication session; and
provide, via the switch fabric, the identified metadata to a network monitoring tool of the monitoring fabric that detects and responds to a threat based on the identified metadata.

18. The non-transitory computer readable medium of claim 17 wherein the metadata identifies a software application generating the traffic flow.

19. The non-transitory computer readable medium of claim 17 wherein the plurality of mirrored packets comprise packets sent from the first client to the second client and packets sent from the second client to the first client.

20. The non-transitory computer readable medium of claim 17 wherein the deep packet inspection of the subset of the received plurality of mirrored packets is performed in accordance with instructions requiring an IP address of the subset of the received plurality of mirrored packets to match one of a specified plurality of IP addresses.

* * * * *